Patented July 18, 1950

2,515,797

UNITED STATES PATENT OFFICE 2,515,797

CONTINUOUS PROCESS FOR THE DEHYDROXYLATION OF CASTOR OIL

Sol B. Radlove, Newton, Iowa, assignor to The Maytag Company, Newton, Iowa, a corporation of Delaware No Drawing. Application January 2, 1947, Serial No. 719,936

2 Claims. (Cl. 260—405.5)

The present invention relates to a method and manner of treating castor oil and other related hydroxy compounds and especially to a novel method or process for the continuous dehydroxylation of hydroxylated compounds such as castor oil, methyl ricinoleate and ricinoleic acid.

My invention further comprehends treating castor oil and related hydroxy compounds with a suitable catalyst of the proper concentration in a thin film or small amounts to secure maximum exposure to heat at high temperatures (240° C. to 400° C.) for relatively short periods of time, for example, from about five seconds to approximately five minutes, and in such a manner that the ratio of the surface heated to the volume or weight of the material involved is high. By treating relatively small quantities or amounts of the material in the manner contemplated, the heat is applied uniformly and quickly throughout the material for the required or desired period of time.

Another object of the present invention is the continuous production of a dehydroxylated castor oil and its conversion from a non-drying type oil to one having drying characteristics. Such a drying oil is extremely valuable when combined with other components in the manufacture of paints, varnishes, alkyds, etc.

A further object of the present invention is the provision of a novel process of dehydroxylating glyceride oils which comprises introducing the oil over a heated surface in a thin film or in small amounts to give maximum exposure to the heat, and with the surface of the film being exposed or subjected to a sub-atmospheric pressure.

Another object of my invention is a novel process for the continuous production of a dehydroxylated castor oil containing a minimum of 29 per cent diene conjugation.

The invention further comprehends a novel continuous process whereby it is possible to produce a dehydroxylated castor oil having a viscosity in the E–F range on the Gardner-Holdt scale, a property of extreme importance in the manufacture of some paints and alkyds.

In commercial practice castor oil is dehydroxylated by a batch process which involves the heating of the oil with a suitable catalyst for periods as long as four hours or more and at temperatures of approximately 250° C. to 280° C., under vacuum, inert gas or steam, until the required viscosity, refractive index or iodine value is reached. In order to avoid excessive polymerization, the dehydroxylation of the oil is generally stopped before an oil having a low acetyl value, which indicates substantially complete dehydroxylation, is reached.

In the dehydroxylation of castor oil the removal of water from the ricinoleic acid groups of the triglyceryl ester is involved. This group comprises the principal constituent of the oil and consists of ricinoleic acid, 12 hydroxy 9–10 octadecenoic acid and is present to the extent of approximately 80 to 85% of the total fat acids. The remainder of the fat acids of the triglyceryl esters being minor amounts of such acids as linoleic, oleic, dihydroxy stearic and stearic. The removal of the hydroxyl group of the 12th carbon atom simultaneously with a hydrogen atom from an adjacent carbon atom to form water, results in the formation of a new double bond between the 12–13 or 11–12 carbon atoms. By this reaction increased unsaturation of the castor oil takes place, thus converting it from a nondrying to a very desirable drying oil.

In the preferred embodiment, the castor oil or other hydroxylated compounds may be continuously dehydroxylated by passing the oil or materials, with a suitable catalyst depending upon the material to be treated, through a heating zone under vacuum. It is important in this process that heat be absorbed by the oil quickly and uniformly to its dehydroxylation temperature and that the time of exposure to the heat be limited, as close as possible, to the point where dehydroxylation of the product has been completed to keep polymerization to a minimum and avoid decomposition and the resultant detrimental discoloring of the finished product. To this end it is preferable to pass the mixture of oil and a catalyst through a heating zone or chamber in a continuous thin film or in small amounts so as to expose the maximum surface of a given quantity of the solution to the heat as is practical to thereby cause heat absorption at a high rate. A dehydroxylation temperature is selected in the chamber and the mixture is maintained at such temperature as it flows therethrough for a period of time depending upon this temperature.

Suitable means are provided for applying heat quickly and uniformly to the mixture, and in the preferred form a tube or a plurality of tubes are positioned vertically and the interior surface of each tube is provided with a spiral rib or wire wrapped around or against its inner surface to provide a spiral or helical flow path. With this construction when oil is admitted to the tube at its upper end, it will adhere to and flow by gravity down the inner surface of the tube in a spiral path. The pitch of the rib is such that the oil maintains a continuous film over the entire inner surface of the tube from the inlet to the outlet. With this continuous flow and continuous film of oil it is difficult for the oil to leave the heated surface and allow dry spots where overheating of the oil will take place, with the resultant danger of polymerization and decomposition when a particle or particles of dehydroxylated oil passes over or coalesces thereon. In other words, the oil film flowing in a continuous downward spiral path tends to keep the entire surface covered and to prevent dry spots from developing. It is to be understood that the tube may be provided with a tortuous path instead of a spiral one, also other means for heating and causing the oil to flow in a continuous film over the entire heating surface may be utilized such as, for example, the oil may be made to pass through a heated tube with a smooth bore, or over an inclined or vertical plate, or through a revolving drum, or by spraying the oil through a heated chamber.

By taking into consideration the dehydroxylation temperature to which the heat transfer surface is heated, the volume and the viscosity of the oil flowing thereover, the size of the heat transfer surface may be determined to yield the desired dehydroxylated product without undue polymerization.

The time of exposure of the oil to the heat may be from approximately five seconds to five minutes, depending upon the temperature employed, the higher the temperature, the shorter the time or the period of exposure required and the dehydroxylating temperatures may vary from 240° to 400° C. In dehydroxylating castor oil excellent results have been secured by exposing it and a suitable catalyst to temperatures ranging from approximately 320° C. to 380° C. for approximately 30 seconds to one and one-half minutes and under a vacuum of approximately 30 millimeters of mercury. This dehydroxylation is preferably carried out under vacuum conditions and generally it has been found that the higher the vacuum the better the resultant product, and that exposing the oil to a vacuum between 15 to 70 millimeters of mercury during the process produces a product having a low acid value. However, it is possible to dehydroxylate the oil at atmospheric, and at sub or super atmospheric pressures under certain conditions depending upon the values placed upon the resultant product. Likewise, an inert gas such as, for example, carbon dioxide or nitrogen may be employed if danger of undue oxidation is present. However, if dehydroxylation is conducted with an inert gas, it is generally preferable to subsequently expose the hot material after such dehydroxylation reaction to a vacuum treatment to remove any small amounts of water or decomposition products that may have formed in the oil.

If an oil is desired having a low viscosity, the treated or dehydroxylated oil should be discharged from the heating chamber as soon as possible after substantially complete dehydroxylation has been reached, and it is cooled rapidly to below 200° C. to prevent continued polymerization. This cooling may be readily accomplished by providing external cooling means of any suitable type. However, if a higher viscosity is desired the heat exchange surface may be extended beyond the point where dehydroxylation will be substantially completed to provide a zone where polymerization takes place to the desired viscosity, after which it is cooled. It is preferable to maintain the temperature in this zone at approximately 300° C. to 310° C. because excessive decomposition takes place at higher temperatures. If this particular polymerization means is not used, the dehydroxylated oil can be conducted to a separate heating chamber wherein the oil is heated and polymerized to its desired value.

I have discovered that with using the above mentioned process, the temperature at which the dehydroxylation of castor oil is carried out has a marked effect on the amount of diene conjugation produced. That is, within certain prescribed limits the higher the temperature at which the dehydroxylation of the castor oil is accomplished, the greater the amount of diene conjugation produced. It is well known that this higher percentage of conjugation in oils is very desirable because it results in products having superior drying properties over oils having a low percentage of conjugation in that it dries at a more rapid rate, polymerizes faster, has less after tack and is more resistant to water and dilute alkali solutions.

Castor oils, dehydroxylated by the batch process at temperatures of 250° to 300° C., contain about 17 to 25 per cent conjugation with the average about 20 to 22 per cent. Higher temperatures cannot be safely used because at temperatures above 300° C., the rate of polymerization increases rapidly and the danger of gelation is great. Castor oils dehydroxylated with my continuous process under the prescribed conditions at temperatures ranging from 300° C. to 400° C. contain, where the acetyl value is 17 and less, 29 per cent and higher conjugation as determined with a Beckman spectrophotometer.

Furthermore, in the present continuous process of dehydroxylation of castor oils or other related hydroxy compounds, I preferably employ as a catalyst a concentrated sulfuric acid or a water diluted sulfuric acid solution. Although a small amount of concentrated sulfuric acid has previously been employed as a catalyst in the dehydroxylation of castor oil or the like in the batch process, it has necessarily been limited to an amount of between 0.05 to 0.1 per cent by weight of the oil treated. Higher percentages have not been possible in such batch process because concentrated sulfuric acid will discolor and decompose the oil excessively when it is exposed to heat for a relatively long period of time, with the result that the treated product may not be acceptable to the industry. However, by my present continuous process and under the prescribed conditions in which the oil is rapidly heated in a thin film or in relatively small quantities for relatively short periods of time, excellent results may be secured by employing concentrations of approximately 0.2 to 1.0 per cent concentrated sulfuric acid by weight of the oil treated without materially discoloring or decomposing the product. Also, under conditions where the oil and catalyst are to be maintained in solution for a period of time before dehydroxylation, a catalyst comprising a solution consisting of 70 to 90 parts of concentrated sulfuric acid and 30 to 10 parts of water by weight used in the above mentioned percentage range has been found to be effective to prevent discoloring and detrimental reaction before dehydroxylation is started. Also, under conditions where it is desired to use a water diluted sulfuric acid solution below 70 per cent an emulsion may be prepared to maintain the castor oil and the catalyst in a miscible solution.

Another important feature of the present continuous process is that the physical properties of the dehydroxylated castor oil may be controlled and a low viscosity in the E-F range on the Gardner-Holdt scale may be produced. This property is of great importance where low viscosity oils are used such as in the manufacture of some paints and alkyds.

In carrying out my novel invention, the castor oil or other related hydroxy compounds to be continuously dehydroxylated is flowed over or sprayed upon a heated surface in a continuous stream in such a manner as to insure a maximum exposure thereof to the heat. For example, castor oil was continuously dehydroxylated by causing the oil containing approximatley 0.6 per cent by weight of concentrated sulfuric acid as a catalyst to flow in a thin film down the inside of a smooth bore tube approximately 184 centimeters long and under a vacuum of approximately 60 millimeters of mercury and heated to a temperature of approximately 340° C. The reaction time was approximately one minute after which the oil was rapidly cooled to below 200° C. to prevent polymerization, and the resulting oil was found to have the following constants or properties:

| | |
|---|---|
| Iodine value | 133.0 |
| Acid value | 4.35 |
| Viscosity (Gardner-Holdt) | E-F |
| Acetyl value | 16.8 |
| Refractive index (25° C.) | 1.4818 |
| Diene conjugation | 30.5 |

As another example, castor oil was continuously dehydroxylated by causing the oil containing 0.6 per cent by weight of an 80% water diluted sulfuric acid solution as a catalyst to flow in a thin film at the rate of 11.5 cubic centimeters per minute on the inside of a vertical tube 92 centimeters long and having a spiral flow path. The run was made under a vacuum of 30 millimeters of mercury and the oil was heated to approximately 350° C. The reaction time was approximately one minute, after which the oil was rapidly cooled to below 200° C. and the resultant product was found to have the following properties:

| | |
|---|---|
| Acetyl value | 13.7 |
| Acid value | 11.9 |
| Viscosity (Gardner-Holdt) | E |
| Diene conjugation | 29.8 |
| Refractive index (25° C.) | 1.4809 |

In the above examples, although two different types of reaction tubes were used, the tube utilizing the spiral flow path is desirable because the spiral motion of the oil as it flows by gravity down the tube maintains the entire inner surface covered with a moving film of oil.

In accordance with the present invention, the castor oil is continuously dehydroxylated to produce a product with a high iodine value, low viscosity, relatively low acid value, essentially complete dehydroxylation (low acetyl value) and with small decomposition losses. Because the reaction conditions are easily controlled, a more uniform product and one with excellent characteristics is produced. The oil with siccatives added, dries to a hard, clear film, will not after-yellow, polymerizes quickly, is resistant to water and dilute alkali solutions and is highly useful when mixed with other components in the manufacture of paints, varnishes, enamels, etc.

Although I have set forth in the above disclosure several specific examples and certain ranges as to temperature, time of exposure and concentrations of catalysts, these are to be taken as illustrative and not as unduly defining or limiting the present novel invention. Furthermore, other objects, capabilities and features will be apparent to those skilled in the art or are inherent in the invention.

Having thus disclosed the invention, I claim:

1. A process of dehydroxylating castor oil which comprises the steps of mixing the oil with substantially 0.1 to 1.0 per cent by weight of a 70 to 90 per cent water diluted sulfuric acid solution as a dehydroxylating catalyst, and causing this mixture to flow by gravity over a heated surface in a spiral flow path whereby this entire heated surface is covered by a continuous thin film of oil, while subjecting the surface of the film to a vacuum to remove volatilized matter formed by the reaction of the catalyst and the oil and to a temperature of between 240° C. to 400° C.

2. A process of dehydroxylating castor oil which comprises the steps of mixing the oil with substantially 0.1 to 1.0 per cent by weight of a 70 to 90 per cent water diluted sulfuric acid solution as a dehydroxylating catalyst, and causing this mixture to flow by gravity over a heated surface in a spiral flow path whereby this entire heated surface is covered by a continuous thin film of oil, while subjecting the surface of the film to a vacuum between 15 and 70 millimeters of mercury, to remove volatilized matter formed by the reaction of the catalyst and the oil while it is subjected to a temperature of 240° C. to 400° C.

SOL B. RADLOVE.

REFERENCES CITED

The following references are of record in the file of this patent:

UNITED STATES PATENTS

| Number | Name | Date |
|---|---|---|
| 2,392,119 | Colbeth | Jan. 1, 1946 |

FOREIGN PATENTS

| Number | Country | Date |
|---|---|---|
| 317,391 | Great Britain | June 16, 1930 |